A. T. Serrell,
Wood Molding Machine.
No. 187. Reissued Jan. 7, 1851.
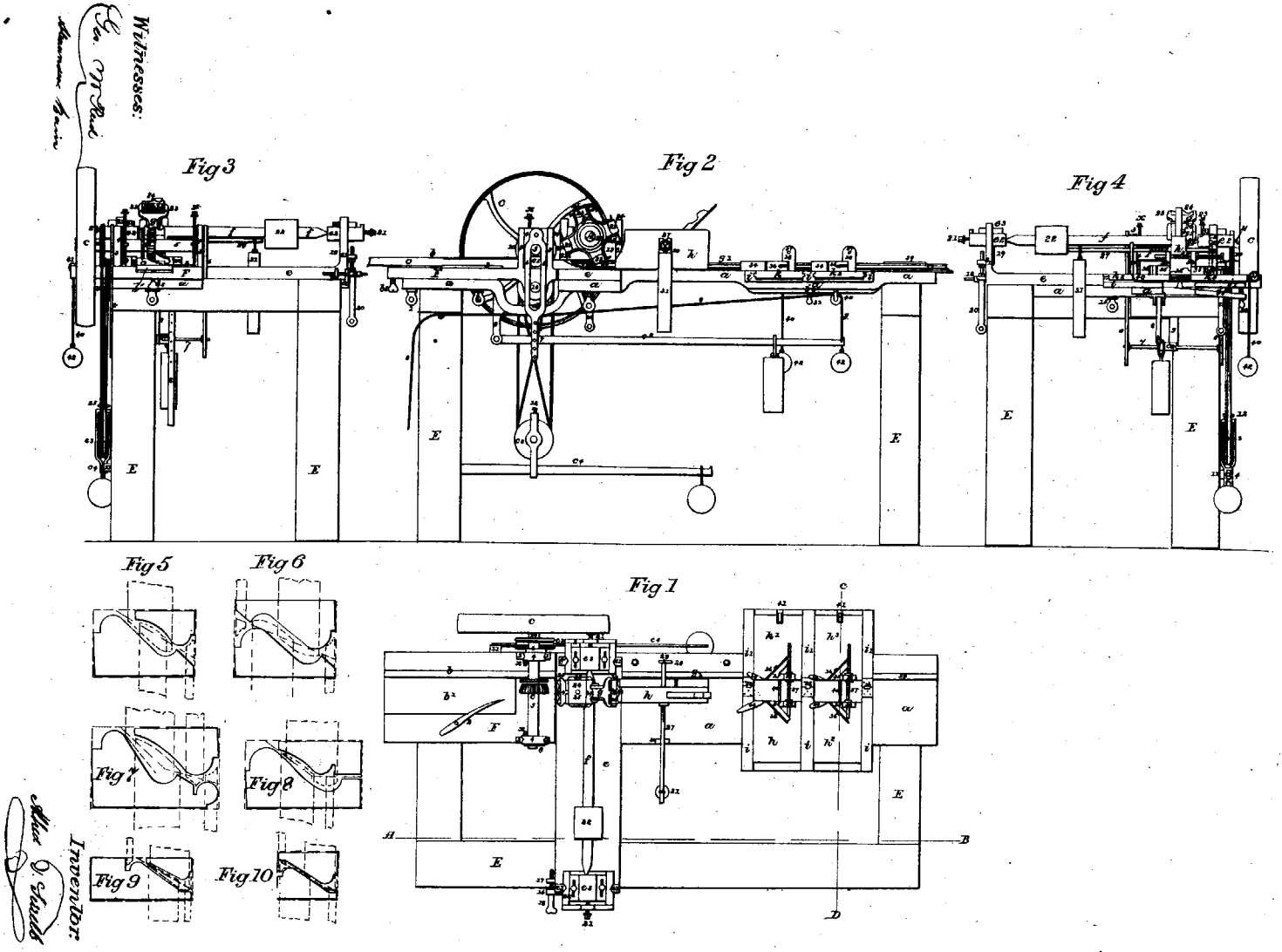
AM. PHOTO-LITHO. CO. N.Y. (OSBORNE'S PROCESS.)

UNITED STATES PATENT OFFICE.

ALFRED T. SERRELL, OF NEW YORK, N. Y.

IMPROVEMENT IN MACHINERY FOR MAKING MOLDINGS.

Specification forming part of Letters Patent No. 5,575, dated May 16, 1848; Reissue No. 187, dated January 7, 1851.

*To all whom it may concern:*

Be it known that I, ALFRED T. SERRELL, of the city of New York, N. Y., cabinet-maker, have invented, made, and applied to use certain new and useful improvements in the construction, arrangement, and conjoint action of well-known mechanical parts, employed with parts invented or improved by me, for producing wood moldings with smooth surfaces, that will not wrinkle when painted or wetted and become what is termed "wooly-faced."

The means employed in said improvements enable me to make such moldings with a saving of materials in the conversion, with a reduction in the amount of labor by which the public are furnished with such articles at a less cost than the same can be made for by hand labor, and with a uniformity of sectional shape and finish of surface that renders such moldings more effective and acceptable in general use than others, for which improvements I seek Letters Patent of the United States; and that the construction, operation, and effect of the said improvements are fully and substantially set forth and shown in the following description, and in the drawings annexed to and making part of this specification, wherein—

Figure 1 is a general plan of a machine complete for use. Fig. 2 is a sectional front elevation through the line A B of Fig. 1, removing the framing to show the parts that would otherwise be hid. Fig. 3 is an end elevation at the end A of Fig. 1, and Fig. 4 is a sectional elevation through the line C D of Fig. 1. The Figs. 5 to 10, inclusive, represent the general manner in which the wood material is first sawed up and the position and points of operation of the feeding-rollers as they work on the molding-strips, as these are used to form various patterns of moldings.

The same letters and numbers, as marks of reference, apply to the like parts in all the several figures, wherein E is the frame of wood or metal, fitted to support a bed of metal, *a*, formed as a T, the middle piece crosswise. This is to be so shaped and fitted as to receive the working parts. F is a metal bed, fitted to slide lengthwise on the bed *a*, and secured by clamp-screws 1 1, so as to adjust the feed-roller close to the rotary cutters, which screws go through slots in the bed *a*. The bed F has on one side a fixed fence, *b*, which is to guide the stuff into the machine by an adjustable spring, 2, pressing the strip of wood against the fence *b*. The outer end of the bed F is countersunk to receive a metal or wood plate, $b'$, let in so as to be flush with the surface, and held in place by two small lugs on the inner end taking indentations in the bed F, and has near the outer end a set-screw, $b^2$, going through the bed F, which raises the outer end to any required height, while the inner end remains even with the face of the bed for a use to be shown hereinafter. 3 3 are two pairs of metal standards, carrying journal-boxes 4 4, taking the journals of a shaft, 5, which is prolonged outside the machine to receive a drum, *c*, with a belt going to the power through a pair of conical drums, by means of which the speed is regulated, and the shaft 5 carries between the standards 3 3 the feeding roller or rollers $c'$, which is formed of one or more flat rings or disks, with serrated edges of diameters varying with the depth at which each is to work, cut either beveling or straight, and keyed on. The journal-boxes 4 4 have each a lug, taking set-screws *x*, to regulate the point to which they shall descend, and outside the boxes 4 4 the shaft 5 receives two slings, 6 6, secured to the boxes 4 4, and descending beneath the bed *a*, to receive an adjustable cross-piece, 7, taking a lever and weight, $c^2$. On a fulcrum, 9, on a standard on the bed *a*, the end of the lever receives a strap 8, which goes over a roller on the under side of the bed *a*, and serves to raise the lever and weight $c^2$ and feed-roller $c'$ and stop the feeding of the material into the machine, and is held by a pin going through holes in the strap 8. The shaft 5 receives a pulley, 10, with a band going to the double-grooved pulley $c^3$, which is sustained by the band on the pulley 10, and has a sling going to a lever and weight, $c^4$, on a fulcrum, 11. On the frame E the sling has over the grooves in the pulley $c^3$ two screws, 12, the points of which serve to remove the dust and chips that may fall in the pulley-grooves. The band passes up over a pulley, 13, on a shaft, 14, in the bed F, and down again to the pulley $c^3$, and is then joined on the pulley 10 to the other end of the band. The shaft 14 carries a roller, *d*, let in flush with the bed F, under the feed-roller $c'$, and to allow a free motion to the roller $d$ the bed $a$ is hollowed down, as shown in Fig. 2. The middle part of the bed $a$ receives a sliding bed, $e$, going across the machine, which is held in place by a clamp-screw, 15, in slots in the bed $a$, and is adjusted by a set-screw, 18, going through a lug, 16, on the bed $a$, and operating in a lug, 17, on the bed $e$. The bed $e$ carries at each end a pair of metal standards, $e'$, formed as slides to receive sliding boxes 19, each with a lug on one side taking a set-screw, 20, going through a lug on the bed $e$. By this screw the sliding boxes 19 are adjusted vertically, their tops being formed as a box, $e^2$, to receive a journal-box, $e^3$, secured by screws going through slots formed lengthwise of the box. The box $e^2$ carries a set-screw, 21, operating against the end of the journal-box $e^3$, which on the opposite side is boxed out to receive a block or peg of hard wood. A journal thus constructed in each pair of standards receives as a center in the block of wood in the box $e^3$ the ends of the shaft $f$, which has a drum, 22, to be connected to any competent power, by means of which it is driven at the proper speed, and carries near the end of the bed $e$ a cutter-block, $g$, with any convenient number of arms, with their ends formed flat at nearly a right angle to the radial line, and on each side edge of the bed thus made are beads 23, forming slides, that receive the cutter-tools 24, with the cutting-edge so formed as to produce the required shape of the molding when operating on the wood. The middle of the cutter has a slot running to the back of the cutter, which receives a screw, 25. This passes through a steel cap, 26, which is set on outside the cutter 24 to take the strain. This screw 25 passes through the slot in the cutter 24 and into the block $g$. By this construction, whenever any cutter has to be sharpened or replaced, the screw 25 is to be slackened up sufficiently to withdraw the cutter 24, which can be replaced or changed without detaching the cap 26 or screw 25. The bed $a$ carries beyond the cutter-heads a second fixed fence, $g'$, by the side of which is a common molding-plane, $h$, of the pattern to correspond with that produced by the rotary cutters, fixed as close to the cutters 24 as convenient, and has a hole bored through the sides near the center to receive a bar, 27, which has a thread to carry a nut setting against one side of the plane $h$. One end of this bar is turned smaller, with a shoulder on the outer end, two sides of which are cut away, which goes through a slot in a screw-stud, 28, so that on putting the shaft through the slot and giving it a quarter-turn the remainder of the collar will hold it in place to be adjusted vertically by a screw, 29, going through the upper part of the slot in the stud 28; or by turning the screw-stud 28 when the bar is not in it a slide, 30, on the inner edge of the bed $a$, receives and holds the shaft 27 and allows of its vertical motion, and pressure is given to the plane $h$ by a weight, 31, on the outer edge of the bar 27. Beyond this the bed $a$ is hollowed down to receive on one side three fixed slides, $i$, which are jointed near the outer edge of the bed $a$ to three similar slides, $i'$, by hinges 32, which are connected together and sustained and adjusted by a screw, 33, on the part $i^3$ of the bed $a$, and the bed $a$ is removed near the middle to prevent any substance lodging to choke the working of the sliding beds $k$, $k'$, $k^2$, and $k^3$, which set in the slides $i$ and $i'$. The first two carry stocks 35 for plane-irons 36, to form roughing-tools, and the second two beds, $k^2$ $k^3$, receive similar stocks and cutters operating as smoothing tools, and each plane is fitted with a lug, 34, in front of the iron to form the face. To the under side of each of the beds $k$ and $k^2$ is a strap or cord, 40, attached, which passes over a pulley, 41, in the outer edge of the slide $k'$ or $k^3$, and descending sustains a weight, 42, each of which serves to draw both pairs of beds $k$ and $k'$ $k^2$ and $k^3$ toward each other, which movement is stopped at any required point by screw-bars 37, with a nut on one part and a collar a short distance from the other end going through holes in lugs 38 on the plane-stocks 35, so that the planes will separate by the bar sliding in the hole, but will not approach each other within a certain adjustable point by the collar taking the lug 38. When thus constructed and adjusted for use, the material $o$ is to be laid on the plate $b'$, which is to be raised to the proper height by the screws $b^2$, and the stuff shoved under the feed roller $c'$, which, operating on the wood, presses it onto the bed, which is not a straight line with the plate $b'$, thus making the spring of the wood under the roller hold the end down against the operation of the rotary cutters 24, at the same time forcing it forward by its rotary motion, the edges of the feed-rollers taking into strip to form the moldings in the parts to be removed by the cutters, as shown by the blue lines in Figs. 5, 6, 7, 8, 9, and 10, force the material on against the operation of the rotary cutters, which form the wood into the required shape; thence the molding passes under and is held down against the operation of the cutters by the molding-plane $h$, which is kept in its place and pressed down by the bar 27 and weight 31, and is smoothed, a complete shaving being taken off as it passes beneath; thence the strip passes between the planes 36, the first two taking a rough shaving off each edge, the second two smoothing, and the complete molding passes out by the guide-fence 39, and is thus ready for use. The screw 33, operating under the slide-frame $i'$, adjusts that by turning it vertically on the hinges 32, so that if the thickest edge of the molding is to be beveled at more or less than a right angle with its bed, it can be finished so without disturbing any of the apparatus.

The Figs. 5 to 10 show by red lines the general manner in which I saw out my strips for forming moldings, as by this means considerable wood is saved in the conversion into moldings, the sawing being effected by one or more diagonal cuts by a circular saw. It will be further seen that by the formation and changeable adjustment of the feeding-rollers they operate so as to stick into those parts only that are to be removed by the rotary cutters. By this means the new and useful effect is produced of saving materials, first, by cutting out two moldings from one strip; but this alone would not be effective without feed rollers that act as described and shown, by not bruising the part that is to remain, and thus saving the amount that would otherwise be wasted by any feed-roller operating equally all over the surface or partially on the highest part of the molding, instead of the parts that are to be taken off.

I do not claim to have invented parallel-grooved feed-rollers to force in the material to be planed; but I do not know of any previous machine in which an angular roller has been applied of either one or more conical rings or disks that operate to feed material of varying angular forms into the machine by contact with the parts that have to be removed by the cutters; neither do I claim the rotary cutter for forming moldings, nor a common molding-plane; but I do not know of any machine in which these two have been employed together, the cutter to give the shape and the molding-plane to finish the surface. Therefore,

What I claim as new and of my own invention, and desire to secure by Letters Patent of the United States, is—

The combination of the feed and pressure rollers constructed and operating substantially as described, with one or more cutters or planes for giving the proper form or dressing to the molding when said combined parts operate upon material which has been sawed or cut, as nearly as may be convenient, into the general form of the molding to be produced, as herein described, for the purpose of economizing the material or facilitating the operation.

In witness whereof I have hereunto set my signature this 4th day of December, 1850.

ALFRED T. SERRELL.

Witnesses:

GEO. W. REID,

W. H. CURTIS, Jr.